(12) United States Patent
Kusakawa et al.

(10) Patent No.: US 6,331,576 B1
(45) Date of Patent: Dec. 18, 2001

(54) SURFACE-DECORATED FOAM SKIN OF CROSS-LINKED RUBBERY SOFT OLEFIN RESIN

(75) Inventors: Koichi Kusakawa; Shigeki Ichimura, both of Komagane (JP)

(73) Assignee: NHK Spring Co Ltd, Kanagawa (JP)

( * ) Notice: Subject to any disclaimer, the term of this patent is extended or adjusted under 35 U.S.C. 154(b) by 0 days.

(21) Appl. No.: 09/719,872

(22) PCT Filed: Jun. 24, 1999

(86) PCT No.: PCT/JP99/03376

§ 371 Date: Dec. 19, 2000

§ 102(e) Date: Dec. 19, 2000

(87) PCT Pub. No.: WO99/67323

PCT Pub. Date: Dec. 29, 1999

(30) Foreign Application Priority Data

Jun. 25, 1998 (JP) .................................................. 10/179322

(51) Int. Cl.⁷ .................................. C08J 9/00; C08J 9/34
(52) U.S. Cl. ............................... 521/142; 521/79; 521/81; 521/143; 521/144; 521/150; 521/51

(58) Field of Search ...................................... 521/142, 143, 521/144, 150, 79, 81, 51

(56) References Cited

FOREIGN PATENT DOCUMENTS

| 523802A | 1/1977 | (JP) . |
| 5598974A | 7/1980 | (JP) . |
| 2258247A | 2/1982 | (JP) . |
| 5720344A | 2/1982 | (JP) . |
| 6333430A | 2/1988 | (JP) . |
| 4229258A | 8/1992 | (JP) . |
| 6278220A | 10/1994 | (JP) . |
| 7137189A | 5/1995 | (JP) . |
| 7179624A | 7/1995 | (JP) . |

*Primary Examiner*—Morton Foelak

(57) ABSTRACT

A surface decorated foam skin of cross-linked rubbery soft olefin resin, comprising rubbery soft olefin resin, characterizing by having
(1) an average cell diameter of 50 to 400 μm,
(2) a crystallinity of 5 to 40%
(3) a hysteresis loss of 35% or lower, and
(4) an embossing percentage of 40% or higher.

4 Claims, 2 Drawing Sheets a.

b.

c.

d.

SURFACE-DECORATED FOAM SKIN OF CROSS-LINKED RUBBERY SOFT OLEFIN RESIN

BACKGROUND OF THE INVENTION

Field of the Invention

The present invention relates to a foam skin of cross-linked rubbery soft olefin resin whose surface is decorated likely as a leather or a cloth having silver like tone, that is, the surface of which is decorated using a mold which has embossed pattern or network pattern. More in detail relates to the rubbery olefin type cross-linked foam with soft resin surface layer having good heat resistance, soft touch and rubbery elasticity.

DESCRIPTION OF PRIOR ART

In general, the foam whose surface is decorated was existent. Among the olefin type foam, polyethylene foam can be decorated by an embossed type mold. However, the surface layer of surface part is melted, re-solidified and becomes fine (because it is high crystalline type resin). And the feeling of it is dry and rough and it is difficult to obtain a feeling of leather like or cloth like. To provide a finer and deeper embossed pattern on the surface, it is necessary to intensify the heat melting condition of the surface, however, since the heat resistance of it is low (because the melting point of polyethylene is low, 100 to 120° C.), shrinking ratio by heating is big and the embossing by good dimensional stability is impossible.

The foam composed by a copolymer of ethylene.vinyl acetate have a little softness, however, the heat resistance of it is inferior to that of polyethylene foam, and has a tendency to be hardened by the heating of emboss processing. Therefore, said foam is not a suited material to provide a fine and deep emboss pattern on it.

Polypropylene type foam has a good heat resistance, and therefore has a merit that the ordinary type of molding technique can be applied. However, it is a hard material, and when the surface is decorated, the surface becomes too fine and the impression of hard is emphasized.

And if the surface of said kinds of foams whose surface is decorated are heated to the temperature higher than the melting point to improve the transcribed ratio of grained pattern at the emboss processing, it looses it's cushion feeling and becomes creased when it is bent, and is far from the feeling of leather like or cloth like, because the viscosity of these materials falls down suddenly and the permanent deformation of foam layer under the decorated surface becomes big at the emboss processing (pressed), As mentioned above, the olefin foam whose surface is decorated was developed and on the market, however the applications of it are for example, a surface material of mold for an engineering works or inside materials for waterproof sheet, and cannot be used as the surface materials for interior decorations.

Meanwhile, as olefin type foam which has soft touch and rubbery elasticity, an olefin type rubber foam which uses EPR or EPT as a starting materials can be mentioned, which has a good feeling as a foam. However, since this rubber foam is rubber foam which has rubber elasticity caused by a bridged material of non-crystalline rubber molecular, is a very difficult materials for surface decoration (embossing) processing. Further, since the shrinking ratio of it by heating is high, the productivity as the materials of surface sheet in a case of after decoration of foam, and is a problem.

Rubber foams except olefin type, especially in a case of chloroprene rubber foam which has excellent soft feeling, besides the ordinary problems which EPR or EPT foams have, chlorine type toxic gas generates at the heating of after decoration process, which is a serious environmental problem for the corrosion of a equipment and for a human body.

As the method to solve these mentioned problems and to obtain a surface decorated olefin type foam which has good heat resistance, softness and rubbery elasticity, methods disclosed in Japanese Patent Laid Open Publication 57-20334 or in Japanese Patent Laid Open Publication 2-258247 are well-known. These methods are the method to decorate the surface by laminating a heat plastic elastomer sheet having good heat resistance, softness and rubbery elasticity on above-mentioned foams. Therefore, in these methods, plural kinds of materials such as foam, surface layer sheet and adhesive are required at need, and the manufacturing process is complicated.

Meanwhile, the method disclosed in Japanese Patent Laid Open Publication 6-278220 is the method to perform a specific grained pattern directly on soft rubber foam by heating the sliced surface of rubber foam whose base material is high crystalline rubber using heat roller. This method is applying the deflecting agglutination feature at hot working of high crystalline rubber and therefore the surface grained pattern is special, however, has problems at surface toughness and heat resistance.

OBJECT OF THE INVENTION

This invention solves the problems accompany to the prior art, and the object of this invention is to provide a new foam material which can be decorated and can be used as an interior finishing material. This material not only has a good heat resistance, softness and rubbery elasticity, but also the surface of which has good heat treatment processability, and the object of this invention is to provide a surface decorated rubbery soft olefin resin cross-linked foam like surface layer.

BRIEF DESCRIPTION OF THE INVENTION

The present invention provides a material to be used as a material for surface layer by an emboss process. Said material is rubbery and also has property of plastics (thermoplastic), and uses properly cross-linked olefin type resin foam.

The important point of this invention is that a surface decorated foam skin of cross-linked rubbery soft olefin resin, comprising rubbery soft olefin resin, characterizing by having average cell diameter of 50 to 400 $\mu$m, a degree of crystallinity of 5 to 40% and a hysteresis loss of 35% or lower. Further, said surface decorated foam skin of cross-linked rubbery soft olefin resin is desirably characterized as the gel fraction is in the region of 20 to 98%, 50% compressive stress is in the region of 0.3 to 1.5 kg/cm$^2$, 90° C. hot dimensional shrinking ratio is smaller than 5%, and the transcribed ratio of grained pattern is smaller than 40%.

That is, the average cell size of the foam like surface layer composed by rubbery soft olefin resin of this invention is 50 to 400 $\mu$m, desirably 50 to 200 $\mu$m, degree of crystallinity is 5 to 40%, desirably 5 to 35%. When the degree of crystallinity is in this region, the foam like surface layer of this invention shows sufficient restorability, good at decorative processing and generates elastic cushioning property. And by making hysteresis loss smaller than 35%, desirably smaller than 30%, and further by making the transcribed ratio of grained pattern smaller than 40%, it becomes possible to provide the surface decorated rubbery soft olefin resin cross-linked foam like surface layer which can be easily decorated by surface heat treatment of a foam maintaining good heat resistance, without spoiling softness and rubbery elasticity.

DETAILED DESCRIPTION OF THE INVENTION

Details of the invention are illustrated as follows.

As the rubbery soft olefin resin which composes this cross-linked foam, olefin type copolymer rubber or the mixture of crystalline polyolefin resin and olefin type copolymer rubber can be used.

Said mixture of crystalline polyolefin resin and olefin type copolymer rubber has a good rubbery elasticity, and when the mixture is used as the rubbery soft olefin resin, the rubbery soft olefin resin cross-linked foam like surface layer which generates excellent restorability by rubbery elasticity can be obtained at each molding process.

The olefin type copolymer rubber of this invention is an amorphous elastic copolymer whose contents of α-olefin of carbon number 2 to 20 is smaller than 50 mol % or an elastic copolymer whose degree of crystallinity is smaller than 50%, that is, non conjugated copolymer by non crystalline α-olefin composed by more than two kinds of α-olefin, and more than two kinds of α-olefin.

As a concrete example of such kind of olefin type copolymer rubber, following kinds of rubber can be mentioned.
(1) Ethylene.α-olefin copolymer rubber
(2) Ethylene.α-olefin.non-conjugated copolymer rubber
(3) Propylene.α-olefin copolymer rubber
(4) Butene.α-olefin copolymer rubber As the concrete example of above mentioned α-olefin, ethylene, propylene, 1-butene, 1-pentene, 1-hexene, 1-octene, 1-nonene, 1-desene, 1-undesene, 1-dodecene, 1-tridecene, 1-tetradecene, 1-pentadecene, 1-hexadecene, 1-heptadecene, 1-octadecene, 1-nonadecene, 1-eicosane, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene and combinations of these components can be mentioned.

As the concrete example of said non-conjugated diene, dicyclopentadiene, 1,4-hexadiene, cyclooctadiene, methylenenorbornene and ethylidenenorbornene can be mentioned.

Mooney viscosity [ML1.4(100° C.)] of these copolymer rubber is 10~250, desirably is 40 to 150.

Iodine number of said (2) ethylene.α-olefin.non-conjugated copolymer rubber is desirably smaller than 25.

Above mentioned olefin type copolymer rubber can exist in non foamed rubbery soft olefin resin composed by the mixture of olefin type copolymer rubber and crystalline polyolefin resin, by any possible states, e.g. non cross-linked, partially cross-linked or fully cross-linked.

Besides above mentioned olefin type copolymer rubber used in this invention, diene type rubber such as styrene-butadiene rubber (SBR), nitrile rubber (NBR), natural rubber (NR), butyl rubber (IIR), SEBS and polyisobutylene can be used.

In the mixture of olefin type copolymer rubber and crystalline polyolefin resin used in this invention, the desirable proportion of olefin type copolymer rubber to be used is bigger than 30 parts and smaller than 100 parts to 100 total parts of olefin type copolymer rubber and crystalline polyolefin resin by weight, more desirably from 50 to 100 weight parts and further desirably 65~95 weight parts.

As the crystalline polyolefin resin, α-olefin mono polymer or copolymer of carbon number 2 to 20 can be mentioned.

As the concrete example of said crystalline polyolefin resin, following (co) polymer can be mentioned.
(1) Ethylene mono polymer [polymer produced by-both low pressure method and high pressure method can be used]
(2) Copolymer of ethylene with smaller than 10 mole % of other α-olefin or vinyl monomer such as vinyl acetate or ethyl acrylate.
(3) Propylene mono polymer.
(4) Random copolymer of propylene with smaller than 10 mole % of other α-olefin.
(5) Block copolymer of propylene and smaller than 30 mole % of other α-olefin.
(6) 1-butene mono polymer.
(7) Random copolymer of 1-butene mono polymer and smaller than 30 mole % of other α-olefin.
(8) 4-methyl-1-pentene mono polymer.
(9) Random copolymer of 4-methyl-1-pentene and smaller than 30 mole % of other α-olefin.

As a concrete example of above mentioned α-olefin composing said same α-olefin as to afore mentioned α-olefin type copolymer can be mentioned.

In the mixture of olefin type copolymer rubber and crystalline polyolefin resin used in this invention, the desirable proportion of crystalline polyolefin resin is smaller than 70 weight parts to 100 total weight parts of olefin type copolymer rubber and crystalline polyolefin resin, more desirably smaller than 50 weight parts and further desirably 5 to 35 weight parts.

As a reformer of said mixture of olefin type copolymer rubber and crystalline polyolefin resin, styrene.butadiene rubber, polybutadiene rubber, polyisoprene rubber or hydrogenated type rubber of these rubber and chlorinated polyethylene can be added by the proportion smaller than 10 weight % to 100 total weight % of olefin type copolymer rubber and crystalline polyolefin resin.

As a softener used for this mixture, paraffin type, naphthene type or aromatic type softener or an ester type plasticizer can be added by the proportion smaller than 10 weight % to 100 total weight % of olefin type copolymer rubber and crystalline polyolefin resin.

As mentioned above, since the foam of this invention is the cross-linked foam of rubbery soft olefin resin, generally a cell forming agent and a cross-linking agent are blended.

Meanwhile, when the cross-linking reaction of resin is made by the exposure of an ionizing radiation such as electron beam, neutron beam, α-rays, β-rays, γ-rays, X-rays or ultraviolet rays, it is not necessary to blend the cross-linking agent. However, at the cross-linking reaction by the exposure of an ionizing radiation, a multi functional methacrylate monomer such as divinylbenzene, triallylcyanurate, ethyleneglycol dimethacrylate, trimethylolpropane trimethacrylate or acrylicmethacrylate, or a multi functional vinyl monomer such as vinylbutylate or vinylstearate can be added as a cross linking promoter. By blending said cross-linking promoter, gel fraction can be adjusted.

As the cell-forming agent to be used in this invention, a heat decomposing type cell forming agent which generates gas by heat decomposition is desirably used. As the concrete example, diethylazocarbonamide, azodicarbonamide, barium azodicarboxylate, 4,4-oxybis (benzenesulfonylhydrazide), 3,3-disulfonehydrazidephenylsulfonic acid and N,N-dinitropentatetramine can be mentioned.

Ordinary, the cell forming agent is added by the proportion of 3 to 25 weight parts to 100 weight part of the matrix of unformed rubbery soft olefin resin, desirable proportion to be added is 5 to 20 weight parts and more desirable proportion to be added is 7 to 15 weight parts.

These cell forming agents can be used alone or by the combination of more than two types, further so called decomposing promoting agent can be used together with.

Further, the cell of resin foam can be generated by the vapor pressure of volatile solvent or water, instead of cell forming by the cell-forming agent.

The cross-linking reaction of this invention can be carried out by the well-known cross-linking method. As the typical example which uses cross-linking agent, a cross-linking by vulcanization and a cross-linking by peroxide can be mentioned.

And also the cross-linking by ionizing radiation can be carried out by the well-known cross-linking method.

The desirable cross-linking agent to be used in the method by peroxide is organic peroxide, and as the concrete example,
dicumylperoxide,
di-tert-butylperoxide,
2,5-dimethyl-2,5-di(tert-butylperoxy)hexane,
2,5-dimethyl-2,5-di(tert-butylperoxy)hexine-3,
1,3-bis(tert-butylperoxyisopropyle)benzene,
1,1-bis(tert-butylperoxy)-3,3,5-trimethylsyclohexane,
n-butyl-4,4-bis(tert-butylperoxy)valeriate,
benzoylperoxide,
p-chlorbenzoylperoxide,
2,4-dichlorobenzoylperoxide,
tert-butylperoxybenzoate,
tert-butyloxyisopropylecarbonate,
diacetylperoxide, lauroilperoxide and
tert-butylcumylperoxide can be mentioned.

Among these compounds,
2,5-dimethyl-2,5-di(tert-butylperoxy)hexane,
2,5-dimethyl-2,5-di(tert-butylperoxy)hexine-3,
1,3-bis(tert-butylperoxyisopropyl)benzene,
1,1-bis(tert-butylperoxy)-3,3,5-trimethylsyclohexane and
n-butyl-4,4-bis(tert-butylperoxy)valeriate can be desirably used from the view point of bad odor and scorching stability, and
1,3-bis(tert-butylperoxyisopropyl)benzene is most desirably used.

The desirable blending ratio of organic peroxide is 0.5 to 2.5 weight parts to 100 weight parts of un-foamed rubbery soft olefin resin matrix, and the substantial blending ratio is determined concerning cell size of foam, gel fraction and density.

In the present invention, as the cross-linking process by said peroxide, peroxy cross-linking promoting agent such as sulfur, p-quinonedioxime, p,p'-benzoylquinonedioxime, N-methyl-N-4-dinitrosoaniline, nitrosobenzene, diphenylguanidine, trimethylolpropane or N,N'-m-phenylenedimaleimide, or a multi-functional methacrylate monomer such as divinylbenzene, trialylcyanu rate, ethyleneglycol dimethacrylate, trimethylolpropane, trimethacrylate or acrylicmethacrylate, or a multi functional vinyl monomer such as vinylbutylate or vinylstearate can be blended.

By blending of said cross-linking promoter, gel fraction can be adjusted.

To the rubbery soft olefin resin of this invention, additives which are ordinary used to the olefin type thermo-plastic elastomer composition such as cross-linking agent, cross-linking promoter, cell forming promoter, weather resistance stabilizer, heat resistance stabilizer, plasticizer, fire retardant, viscosity increasing agent, slipping agent, and pigments can be added at need within the limit not to hurt the object of this invention.

Furthermore, filler can be blended to said rubbery soft olefin resin can be added. As the concrete example of the filler, an organic filler such as carbon black, nitroso pigment, colcothar, phthalocyanine pigment, pulp, fiber like chip or agar-agar and an inorganic filler such as clay, kaoline, silica, diatomaceous earth, aluminum hydroxide, zinc oxide, magnesium hydroxide, titanium oxide, mica, bentonite, sirasu balloon, zeolite, silicate white earth, cement, and silica fume can be mentioned.

The cross-linked foam like surface layer of rubbery soft olefin resin.

Said foam like surface of this invention is a cross-linked foam of rubbery soft olefin resin composed by above mentioned components, and desirable cell size of it is 50 $\mu$m to 400 $\mu$m and more desirably 50 $\mu$m to 200 $\mu$m.

The degree of crystallinity determined by an X-ray diffraction method of the mixture of polyolefin resin and rubber composing said foam like surface layer of this invention which is prepared as mentioned above is desirably to be within the region of 5 to 35% and more desirably 6 to 25%.

Further, the hysteresis loss of the cross-linked foam of rubbery soft olefin resin which composes the foam like surface layer of this invention prepared as above is desirably smaller than 35%, more desirably smaller than 30%.

When the cell size, degree of crystallinity and hysteresis loss of the cross-linked foam like surface layer of rubbery soft olefin resin are within the region mentioned above, the heat treatment processability of foam like surface layer is very good and has good heat resistance and can generate a softness and a rubber elasticity. In the meanwhile, the method to measure the cell size, degree of crystallinity by X-ray diffraction method and hysteresis loss is disclosed in Example of this invention.

Additionally, the gel fraction of the cross-linked foam like surface layer of rubbery soft olefin resin is 20 to 98% and desirably 40 to 90%. When the gel fraction is within the above-mentioned limit, the heat treatment processability of foam like surface layer is very good and has good heat resistance and can generate softness and rubber elasticity.

Further, the 50% compressive stress of the cross-linked foam like surface layer of rubbery soft olefin resin of this invention is 0.3 to 1.5 kg/cm$^2$ and desirably 0.3 to 1.0 kg/cm$^2$, furthermore, the 90° C. hot dimensional shrinking ratio is smaller than 5% and desirably smaller than 3%. When the 50% compressive stress and 90° C. hot dimensional shrinking ratio are within the above mentioned limit, the heat treatment processability of foam like surface layer is very good and has good heat resistance and can generate a softness and a rubber elasticity.

The method for preparation of the cross-linked foam like surface layer of rubbery soft olefin resin.

The cross-linked foam like surface layer of rubbery soft olefin resin of this invention can be prepared by the following method.

As the first step, all components mentioned above are kneaded homogeneously and non-foamed non cross-linked rubbery soft olefin resin is prepared and the resin is molded to a desired shape.

As the method to prepare non foamed non cross-linked rubbery soft olefin resin, for example, the method to fuse and knead a heat decomposition type cell forming agent, a cross-linking agent and other additives separately into the mixture (matrix) composed by olefin type copolymer rubber and crystalline polyolefin resin or olefin type copolymer rubber (matrix) can be mentioned.

In this method, for instance, olefin type copolymer resin and crystalline polyolefin resin are kneaded by a well-known kneader such as V type brabender, tumble brabender, ribbon brabender, Henshel brabender and further kneaded by an extruder, mixing roller, kneaded or Bumbury's mixer.

This kneading process is desirably to be carried out at the temperature lower than decomposing temperature of the heat-decomposing cell forming agent.

The cell forming promoter, wetting agent, weather resistance stabilizer, heat-resistance stabilizer, anti-aging agent and pigments can be blended at any melting kneading process.

Then, to the kneaded product obtained by mentioned kneading process, a cross-linking agent and cross-linking promoting agent and a vulcanization promoting agent are added and kneaded by a well-known kneader such as V type brabender, turnble brabender, ribbon brabender, Henshel brabender at desirably lower temperature than decomposing temperature of cross-linking agent (50° C.), then the kneaded product is added to a conventional well-known kneader such as open type mixing roller, not-open type Bumbury's mixer, extruder, kneader or continuous mixer and said cross-linking agent and other agents are dispersed.

Said kneading process is carried out at the lower temperature than the decomposition temperature of a heat decomposing type cell forming agent and a cross-linking agent, and desirable temperature is 20 to 50° C. lower temperature than one minute half-time temperature of the cross-linking agent.

As the another preparing method of non foamed non cross-linked rubbery soft olefin resin, the method to add a heat decomposing cell forming agent, a cross-linking agent and other additives simultaneously to olefin type copolymer rubber and crystalline polyolefin resin and to melt and knead can be mentioned.

In above mentioned method, olefin type copolymer rubber, pellets of crystalline polcrystalline polyolefin resin, and additives such as heat decomposing cell forming agent and cross-linking agent are continuously kneaded at lower temperature than the decomposing temperature of the heat decomposing cell forming agent and cross-linking agent using for example double shaft extruder.

Then, the obtained non-foamed non cross-linked rubbery soft olefin resin is formed to a sheet shape at the temperature which the heat decomposing cell forming agent and cross-linking agent does not decompose, and non cross-linked, non-foamed sheet type product can be obtained.

Said forming can be carried out by conventional well-known forming machine such as heat press or calendar roll.

Further, in the present invention, melting and kneading of olefin type copolymer rubber and crystalline polyolefin resin, melting and kneading of obtained mixture with a heat decomposing cell forming agent and a cross-linking agent and a procedure to obtain non cross-linked, non-foamed soft resin, can be carried out by series using a molding machine such as single shaft extruder or double shaft extruder.

The foam like surface layer of rubbery soft olefin resin can be obtained by processing said formed product of non cross-linked, non-foamed soft resin obtained by above-mentioned procedure. The formed sheet is provided to a continuous heat double press belt which has specific same height brims on both width end or stuffed into a specific mold, heat pressed at higher temperature than 130° C. (desirably 140° C. to 230° C.) and higher pressure than 40 kg/cm² (desirably 60 kg/cm² to 150 kg/cm²) for fixed time and then release the pressure, or after the heat pressure the un-foamed or the half foamed imperfect foam is secondary foamed at atmosphere pressure, thus the foam like surface layer of rubbery soft olefin resin can be obtained.

In a case of foaming at atmosphere pressure, un-foamed product is heated by a conventional well-known method such as hot air circulating, salt bath heating, radio-frequency heating, infra red rays heating and heat press and a cross-linking agent and heat decomposing foaming agent contained in un-foamed product are decomposed by heat, thus the foam like surface layer of rubbery soft olefin resin of this invention can be obtained.

Among the above mentioned preparation method, the most desirable method is mentioned as follows. That is, the heat pressure is made for fixed time then release the pressure and obtain the foam like surface layer of rubbery soft olefin resin of this invention directly, or the un-foamed or the half foamed imperfect foam is secondary foamed at atmosphere pressure, and obtain the cross-linked foam like surface layer of rubbery soft olefin resin.

At the above-mentioned foaming process or just after the foaming, the specific pattern can be provided on the surface of foam and further the surface toughness can be improved by stamping of pattern.

The cross-linked foam like surface layer of rubbery soft olefin resin of this invention is composed by a rubbery soft olefin resin, and is the cross-linked foam like surface layer of rubbery soft olefin resin of
(1) average cell size is 50 μm to 400 mμ,
(2) degree of crystallinity of the foam is 5 to 40%,
(3) hystereresis loss is smaller than 35%, and
(4) gel fraction is 20 to 98%,
(5) 50% compressive stress is 0.3 to 1.5 kg/cm² and 90° C. hot dimensional shrinking ratio is 5 to 40%, has especially excellent processability of the surface of foam, has good heat resistance, has softness and rubber elasticity like fabrics or cloth and can obtain a decorated foam having an appearance of synthetic leather.

Concretely, as the heat treatment method of the foam surface, the surface of foam obtained by above mentioned method, desirably the surface of sliced foam is held and pressed between heat rollers or a heat press, or by a vacuum forming (concave mold) and the smoothness and the toughness of the foam surface is remarkably improved. By engraving a grained pattern on the surface of roller, presser or a mold of vacuum forming (concave mold) and transcribe the pattern to the surface of foam, softness and rubbery elasticity can be generated on the surface of foam.

As the more desirable processing method of the foam surface, the following method can be mentioned. That is, before the pressing by rollers or a presser or a vacuum forming, the surface of foam is previously heat treated by flame, infrared rays or hot air, then cold or hot pressed or formed by vacuum forming, and the surface of the cross-linked foam like surface layer of rubbery soft olefin resin is processed like a leather.

When a grained pattern or a network pattern is provided to the material of this invention, even if the mold compressive ratio is closely to 10% the material is not crushed because it has a good restoration ability, and profound emboss like or cloth like pattern can be provided. This phenomenon cannot be expected to the conventional olefin type foam. For example, after the surface of a conventional polyethylene foam is heat treated, when compressive ratio at cold press is raised, the foam is crushed remarkably and violently curled and good decorated foam cannot be obtained.

These kinds of surface treatment process can be made continuously or by batch processing. And the cross-linked foam like surface layer of rubbery soft olefin resin on which the combination surface treatment process with a coating or a printing is possible can be provided.

In the cross-linked foam like surface layer of rubbery soft olefin resin of this invention, the state of reverse side is not limited. The reverse side can be the foam itself or can be laminated to cloth, un-woven cloth or sheet of thermoplastic resin.

BRIEF ILLUSTRATION OF DRAWINGS

b is the case showing that the transcript ratio is not good (showing the case in which the foam is hard and edge is dulled, and in this case W>W')

c is the case showing that the transcript ratio is not good (showing the case in which permanent deformation at the pressing process is big, and in this case H>H')

b is the case showing that the transcript ratio is not good (showing the case in which the foam shrinks by the influence of the preheating at the pressing process, and in this case P>P' and W>W')

EXAMPLES

The present invention is illustrated by the Examples, however, not intended to be limited to them.

In the Examples and Comparative Examples, density of a foam (g/cm$^3$), average cell size (mm) and degree of crystallinity (%) are measured by following methods.

<Measuring Method>

(1) density (g/cm$^3$)

Specimen of 10 cm×10 cm square is cut from the sheet of foam of thickness t(cm), and the weight (W[g]) of the specimen is weighted and the density (g/cm$^3$) is calculated by following numerical formula.

$$\text{density (g/cm}^3) = W/(t \times 10 \times 10)$$

(2) average cell size

Numbers of cells (n) per 3.3 mm square are counted by a microscope of 60 magnification, and the average cell size (mm) is calculated by following numerical formula.

$$\text{average cell size (mm)} = \sqrt{(3.3)/\pi \cdot n}$$

(3) degree of crystallinity

Measured by a wide-angle X-ray diffraction (signal intensity[CPS]... 2θ[3°<2θ<40°]), total signal area belonging to crystalline is divided by total signal area belonging to crystalline and amorphous state and expressed by %. This value is indicated as the crystalline (4) hysteresis loss (%)

Figure 1:
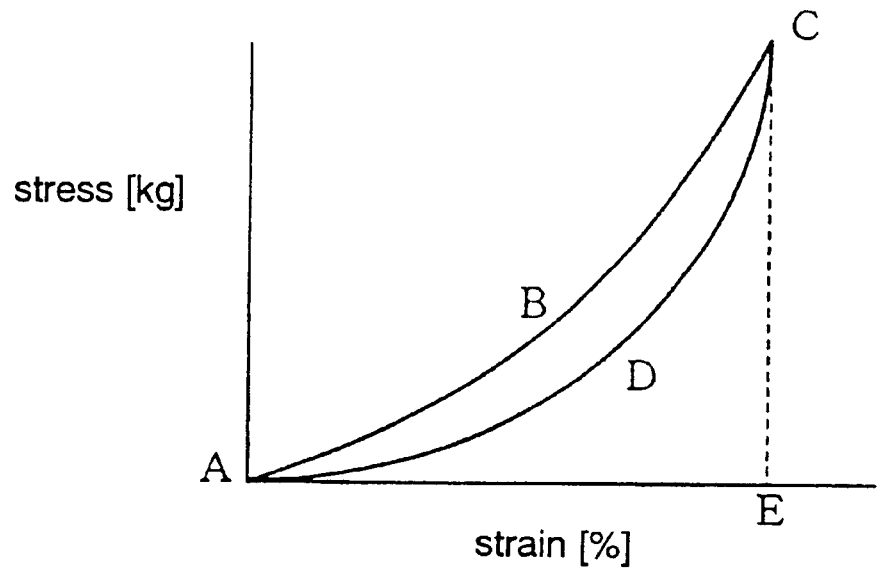
FIG. 1 is a drawing indicates a hysteresis curve to measure the hysteresis loss of the foam of this invention.

Specimens of 5 cm×5 cm square are cut from the sheet of foam of thickness t(cm), and the specimens are piled us and adjusted to 2.5 mm thickness and prepare a specimen for the measurement. Said prepared specimen is pressed by 50 mm/min compressive speed at room temperature using a compression tester and the hysteresis at room temperature is measured. The compressive ratio is 50% to the original thickness. The obtained hysteresis curve at above mentioned condition is recorded to the recording paper is shown in FIG. 1, and the hysteresis loss is measured by following numerical formula.

$$\text{hysteresis loss (\%)} = (i\ S1/S0) \times 100$$

wherein,

S1: area surrounded by curve B and curve D

S0: area surrounded by curve B, curve AE and Curve CE (5) gel fraction (%)

A foam pad is cut to 1 mm square specimen chips, contained into a Soxhlet extractor and oil in specimen is extracted by chloroform. The foam pad specimen after extracted is dried up by vacuum and 0.2 g (W0[g]) of specimen is weighted. The weighted specimen is dissolved into 500 ml of 130° C. heated xylene for 6 hours and xylene soluble parts are extracted from the specimen. The xylene insoluble part is rinsed by acetone and dried up in 100° C. vacuum dryer for 1 hour. After dried up, the xylene insoluble part is weighted (W1[g]) and gel fraction (%) is calculated by following numerical formula.

$$\text{gel fraction (\%)} = (W1/W0) \times 100$$

(6) 50% compressive hardness [kg/cm$^2$]50% compressive hardness [kg/cm$^2$] at 25° C. is measured in accordance with the measuring method of JISK-6767.

(7) hot dimensional shrinking ratio (%) hot dimensional shrinking ratio at 90° C. is measured in accordance with the measuring method of JISK-6767.

(8) transcribed ratio of grained pattern (%)

Figure 2:
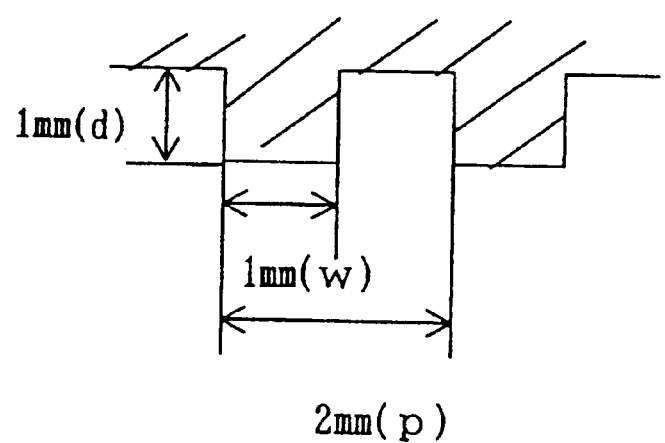
FIG. 2 is a mold used to measure the transcribed ratio of grained pattern of the foam of this invention.
Figure 3:
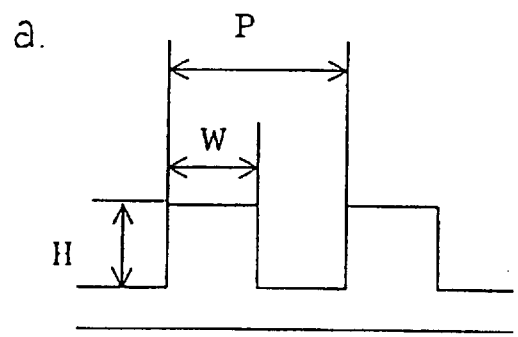
FIG. 3 is the schematic view of microscopic observation showing transcript of grained pattern by use of the mold of FIG. 1 a shows the case of good transcript ratio.
Figure 3:
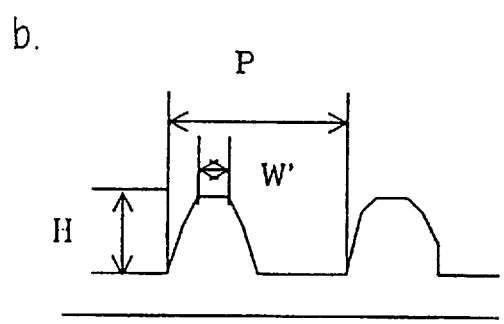
Figure 3:
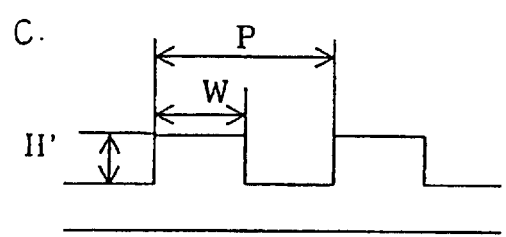
Figure 3:
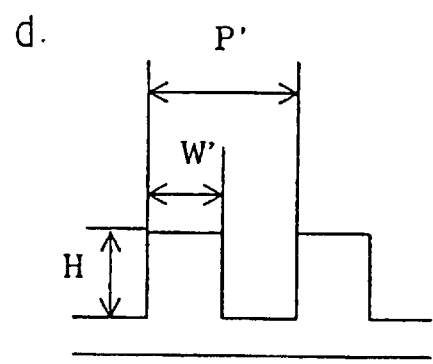

Grained pattern is transcribed over the surface of a foam using a concave mold with 1.0 mm width (W), 1.0 mm depth (d), 2.0 mm pitch (p) grit pattern (groove) illustrated by FIG. 2. After processed, the foam is cut along with the grit mark and the height of grained pattern (H) and pitch (P) are observed by a microscope, and transcribe ratio of grained pattern (%) is calculated by following numerical formula.

$$\text{transcribed ratio of grained pattern (\%)} = [\text{height}(H) + \text{pitch}(P)] \times 100/3$$

Substantial examples indicating several transcribed pattern are shown in FIG, 3.

Example 1

To 100 weight parts of the mixture composed by ethylene.propylene. non-conjugated copolymer rubber [EPT; 38 mol % propylene content. Iodine number 12, MFR (ASTM 1238, 190° C., 2.16 kg load) 1.1 g/10 min], polyethylene [PE; 100 mol % ethylene content, MFR (ASTM 1238, 190° C., 2.16 kg load) 1.6 g/10 min] and polypropylene [P; 100% propylene content, MFR (ASTM 1238, 190° C., 2.16 kg load) 5.0 g/10 min], wherein EPT:PE:PP is 6:2:1, 10 weight parts of azodicarbonamide [ADCA; cell forming agent], 1.2 weight parts of 2,5-dimethyl-2,5-di(tert-dibutylperoxy) hexine-3 [peroxide cross-linking agent] and 0.3 parts of trimethylolpropanetrimethacrylate [TMPT; cross-linkage promoting agent] are added and kneaded by a roller mixer and non-cross-linked, non-foamed composition is obtained.

Then, the resin composition is poured into the mold of 3 mm thickness and heat pressed at 210° C., 100 kg/cm$^2$ as to carry out cross-linking and foaming and obtained the sheet of cross-linked foam whose density is 0.058 g/cm$^3$ and thickness is 8.7 mm. This cross-linked foam skin is a foam of 80 μm average cell size, 8% degree of crystallinity, 20% hysteresis loss, 77.0% gel fraction, 650 g/cm$^2$ 50% compressive stress and 3.3% hot dimensional shrinking ratio at 90° C., 22 hours.

Obtained sheet of cross-linked foam are sliced to 3 mm thickness and infrared rays is irradiated, then cold pressed between a flat plate and a plate on which grained pattern is engraved at compressive ratio 50% and 90%. The surface of the foam faced to the flat plate becomes smooth surface with a skin layer, and to the surface of the foam faced to the plate with grained pattern the pattern is clearly transcribed (transcribed ratio of grained pattern, 91% and 96%). After the surface heat treatment, 50% compressive stress and hot dimensional shrinking ratio at 90° C., 22 hours are measured and the result of 600 g/cm² and 1.1% can be obtained. Thus, the cross-linked foam like surface layer of rubbery soft olefin resin with smooth and tough skin layer and grained pattern whose heat resistance and softness is good can be obtained.

Example 2

To 100 weight parts of the mixture composed by 60 weight parts of ethylene.propylene.non-conjugated copolymer rubber [EPT], polyethylene [PE] and polypropylene [PP] of Example 1, wherein EPT:PE:PP is 6:2:1, 3 weight parts of azodicarbonamide [ADCA; cell forming agent], 1.2 weight parts of 2,5-dimethyl-2,5-di(tert-dibutylperoxy)hexine-3 [peroxide cross-linking agent] and 0.3 parts of trimethylolpropanetrimethacrylate [TMPT; cross-linkage promoting agent] are added and kneaded by a double shaft kneading extruder at 120° C. and non-cross-linked, non-foamed composition is obtained.

Then, the resin composition is poured into the mold of 3 mm thickness and heat pressed at 210° C., 100 kg/cm² as to carry out cross-linking and foaming and obtained the sheet of cross-linked foam whose density is 0.053 g/cm³ and thickness is 7.2 mm. This cross-linked foam skin is a foam of 95 µm average cell size, 8% degree of crystallinity, 22% hysteresis loss, 71.0% gel fraction, 980 g/cm² 50% compressive stress and 3.5% hot dimensional shrinking ratio at 90° C., 22 hours.

Obtained sheet of cross-linked foam are sliced to 3 mm thickness and infrared rays is irradiated, then cold pressed between a flat plate and a plate on which grained pattern is engraved at the compressive ratio 50% and 90%. The surface of the foam faced to the flat plate becomes smooth surface with a skin layer, and to the surface of the foam faced to the plate with grained pattern the pattern is clearly transcribed (transcribed ratio of grained pattern, 83% and 93%). After the surface heat treatment, 50% compressive stress and hot dimensional shrinking ratio at 90° C., 22 hours are measured and the result of 970 g/cm² and 1.3% can be obtained. Thus, the cross-linked foam like surface layer of rubbery soft olefin resin with smooth and tough skin layer and grained pattern whose heat resistance and softness is good can be obtained

Example 3

To 100 weight parts of the mixture composed by 65 weight parts of ethylene.propylene.non-conjugated copolymer rubber [EPT] and 10 weight % of polypropylene [PP] of Example 1, 6 weight parts of azodicarbonamide [ADCA; cell forming agent], 0.7 weight parts of 2,5-dimethyl-2,5-di(tert-dibutyl peroxy)hexine-3 [peroxide cross-linking agent], 0.7 parts of trimethylolpropane-trimethacrylate [TMP; cross-linkage promoting agent] and 1.0 part of zinc oxide are added and kneaded by a roller mixer at 120° C. and non-cross-linked, non-foamed composition is obtained.

Then, the resin composition is poured into the mold of 3 mm thickness and heat pressed at 165° C., 100 kg/cm² as to carry out cross-linking and foaming and obtained the sheet of cross-linked foam whose density is 0.047 g/cm³ and thickness is 8.7 mm. This cross-linked foam skin is a foam of 58 µm average cell size, 27% degree of crystallinity, 25% hysteresis loss, 65.0% gel fraction, 750 g/cm² 50% compressive stress and 2.5% hot dimensional shrinking ratio at 90° C., 22 hours.

Obtained sheet of cross-linked foam are sliced to 3 mm thickness and infrared rays is irradiated, then cold pressed between a flat plate and a plate on which grained pattern is engraved at compressive ratio 50% and 90%. The surface of the foam faced to the flat plate becomes smooth surface with a skin layer, and to the surface of the foam faced to the plate with grained pattern the pattern is clearly transcribed (transcribed ratio of grained pattern, 91% and 96%). After the surface heat treatment, 50% compressive stress and hot dimensional shrinking ratio at 90° C., 22 hours are measured and the result of 730 g/cm² and 0.7% can be obtained. Thus, the cross-linked foam like surface layer of rubbery soft olefin resin with smooth and tough skin layer and grained pattern whose heat resistance and softness is good can be obtained

Example 4

To 100 weight parts of the mixture composed by 60 weight parts of ethylene.propylene.non-conjugated copolymer rubber [EPT], polyethylene [PE] and polypropylene [PP] of Example 1, wherein EPT:PE:PP is 6:1:2, 6 weight parts of azodicarbonamide [ADCA; cell forming agent], 1.4 weight parts of 1,3bis(tert-butylperoxyisopropyle)benzene [peroxide cross-linking agent], 0.3 parts of trimethylolpropanetrimethacrylate [TMP; cross-linkage promoting agent], 0.5 weight parts stearic acid (slipping agent) and 1.0 part of zinc oxide are added and kneaded by a roller mixer at 1 20° C. and fed out as a sheet by a roller and non-cross-linked, non-foamed composition is obtained.

Then, the resin composition is poured into the mold of 3 mm thickness and heat pressed at 165° C., 100 kg/cm² as to carry out cross-linking and foaming and obtained the sheet of cross-linked foam whose density is 0.049 g/cm³ and thickness is 8.7 mm. This cross-linked foam skin is a foam of 64 µm average cell size, 16% degree of crystallinity, 21% hysteresis loss, 76.0% gel fraction, 690 g/cm² 50% compressive stress and 1.5% hot dimensional shrinking ratio at 90° C., 22 hours.

Obtained sheet of cross-linked foam are sliced to 3 mm thickness and infrared rays is irradiated, then cold pressed between a flat plate and a plate on which grained pattern is engraved at compressive ratio 50% and 90%. The surface of the foam faced to the flat plate becomes smooth surface with a skin layer, and to the surface of the foam faced to the plate with grained pattern the pattern is clearly transcribed (transcribed ratio of grained pattern, 86% and 93%). After the surface heat treatment, 50% compressive stress and hot dimensional shrinking ratio at 90° C., 22 hours are measured and the result of 660 g/cm² and 0.9% can be obtained. Thus, the cross-linked foam like surface layer of rubbery soft olefin resin with smooth and tough skin layer and grained pattern whose heat resistance and softness is good can be obtained

Example 5

To 100 weight parts of the mixture composed of ethylene.propylene. non-conjugated copolymer rubber [EPT] and polypropylene [PP] of Example 1, wherein EPT:PP is 6:3, 10 weight parts of azodicarbonamide [ADCA; cell forming agent], 0.8 weight parts of 1,3bis(tert-butylperoxy isopropyle)benzene [peroxide cross-linking agent], 0.8 parts of trimethylolpropane-trimethacrylate [TMPT; cross-linkage promoting agent], 0.5 weight parts stearic acid and 1.0 part of zinc oxide are added and kneaded by a roller mixer at 120° C. and fed out as a sheet by a roller and non-cross-linked, non-foamed composition is obtained.

Then, the resin composition is poured into the mold of 2 mm thickness and heat pressed at 210° C., 100 kg/cm² as to carry out cross-linking and foaming and obtained the sheet of cross-linked foam whose density is 0.045 g/cm³ and thickness is 5 mm. This cross-linked foam skin is a foam of 110 μm average cell size, 21% degree of crystallinity, 20% hysteresis loss, 67.0% gel fraction, 740 g/cm² 50% compressive stress and 1.0% hot dimensional shrinking ratio at 90° C., 22 hours.

To the obtained sheet of cross-linked foam infrared rays is irradiated, then cold pressed between a flat plate and a plate on which grained pattern is engraved at compressive ratio 50% and 90%. The surface of the foam faced to the flat plate becomes smooth surface with a skin layer, and to the surface of the foam faced to the plate with grained pattern the pattern is clearly transcribed (transcribed ratio of grained pattern, 94% and 96%). After the surface heat treatment, 50% compressive stress and hot dimensional shrinking ratio at 90° C., 22 hours are measured and the result of 710 g/cm² and 0.8% can be obtained. Thus, the cross-linked foam like surface layer of rubbery soft olefin resin with smooth and tough skin layer and grained pattern whose heat resistance and softness is good can be obtained Comparative Example 1

To 100 weight parts of ethylene.propylene.non-conjugated copolymer rubber [EPT] of Example 1, 6 weight parts of azodicarbonamide [ADCA; cell forming agent], 1.2 weight parts of 2,5-dimethyl-2,5-di(tert-dibutylperoxy) hexine-3 [peroxide cross-linking agent], 0.3 parts of trimethylolpropane-trimethacrylate [TMPT; cross-linkage promoting agent], 0.5 weight parts stearic acid and 1.0 part of zinc oxide are added and kneaded by a roller mixer at 120° C. and fed out as a sheet by a roller and non-cross-linked, non-foamed composition is obtained.

Then, the resin composition is poured into the mold of 3 mm thickness and heat pressed at 165° C., 100 kg/cm² as to carry out cross-linking and foaming and obtained the sheet of cross-linked foam whose density is 0.070 g/cm³ and thickness is 8.3 mm. This cross-linked foam skin is a foam of 150 μm average cell size, 0% degree of crystallinity, 20% hysteresis loss, 90.0% gel fraction, 630 g/cm² 50% compressive stress and 5.3% hot dimensional shrinking ratio at 90° C., 22 hours.

Obtained sheet of cross-linked foam are sliced to 3 mm thickness and infrared rays is irradiated, then cold pressed between a flat plate and a plate on which grained pattern is engraved by compressive ratio 50% and 90%. The surface of the foam faced to the flat plate is largely shrunk and hardened and becomes coarse, and to the surface of the foam faced to the plate with grained pattern the pattern the grained pattern is not transcribed (transcribed ratio of grained pattern, 8% and 13%). And after the surface heat treatment, 50% compressive stress and hot dimensional shrinking ratio at 90° C., 22 hours are measured and the result of 600 g/cm² and 6.1% can be obtained. Softness is good, however, the heat resistance is not good.

Comparative Example 2

To 100 weight polyethylene [PE] of Example 1, 6 weight parts of azodicarbonamide [ADCA; cell forming agent], 0.8 weight parts of 1,3bis(tert-butylperoxy isopropyle)benzene [peroxide cross-linking agent], 0.5 weight parts stearic acid and 1.0 part of zinc oxide are added and kneaded by a roller mixer at 120 °C. and fed out as a sheet by a roller and non-cross-linked, non-foamed composition is obtained.

Then, the resin composition is poured into the mold of 3 mm thickness and heat pressed at 165° C., 100 kg/cm² as to carry out cross-linking and foaming and obtained the sheet of cross-linked foam whose density is 0.045 g/cm³ and thickness is 8.7 mm.

This cross-linked foam skin is a foam of 110 μm average cell size, 55% degree of crystallinity, 55% hysteresis loss, 78.0% gel fraction, 1500 g/cm² 50% compressive stress and 7.3% hot dimensional shrinking ratio at 90° C., 22 hours.

Obtained sheet of cross-linked foam are sliced to 3 mm thickness and infrared rays is irradiated, then cold pressed between a flat plate and a plate on which grained pattern is engraved by compressive ratio 60% and 90%. The surface of the foam faced to the flat plate becomes smooth surface with a skin layer, and to the surface of the foam faced to the plate with grained pattern the pattern seemed to be clearly transcribed, however, the transcribed ratio of grained pattern are 65% and 35%, because the shrinkage at heating process and permanent deformation at pressing process are big. After the surface heat treatment, 50% compressive stress and hot dimensional shrinking ratio at 90° C., 22 hours are measured and the result of 1800 g/cm² and 5.1% can be obtained, and the softness and heat resistance are hurt. When the surface with grained pattern is slightly fold to the inside, many creases are generated and the appearance of decorated surface is hurt.

Comparative Example 3

To 100 weight parts of ethylene. vinyl acetate. copolymer [EVA; 14% vinyl acetate content, MFR (JISK-6703, 190° C., 2.16 kg load) 1.3/10 min], 10 weight parts of azodicarbonamide [ADCA; cell forming agent], 0.8 weight parts of 1,3bis(tert-butylperoxy isopropyle)benzene [peroxide cross-linking agent], 0.5 weight parts stearic acid and 1.0 part of zinc oxide are added and kneaded by a roller mixer at 120° C. and fed out as a sheet by a roller and non-cross-linked, non-foamed composition is obtained.

Then, the resin composition is poured into the mold of 3 mm thickness and heat pressed at 165° C., 100 kg/cm² as to carry out cross-linking and foaming and obtained the sheet of cross-linked foam whose density is 0.045 g/cm³ and thickness is 8.7 mm.

This cross-linked foam skin is a foam of 80 μm average cell size, 9% degree of crystallinity, 45% hysteresis loss, 93.0% gel fraction, 1100 g/cm² 50% compressive stress and 8.5% hot dimensional shrinking ratio at 90° C., 22 hours.

Obtained sheet of cross-linked foam are sliced to 3 mm thickness and infrared rays is irradiated, then cold pressed between a flat plate and a plate on which grained pattern is engraved at compressive ratio 50% and 90%. The surface of the foam faced to the flat plate becomes smooth surface with a skin layer, and to the surface of the foam faced to the plate with grained pattern the pattern is not clearly transcribed. The transcribed ratio of grained pattern are 15% and 25%, and are low level, because the diacetic acid reaction is progressed in a molecular and intermolecular cross-linking reaction is progresses at surface heating process After the surface heat treatment, 50% compressive stress and hot dimensional shrinking ratio at 90° C., 22 hours are measured and the result of 1500 g/cm² and 10.2% can be obtained, and the softness and heat resistance are spoiled. This product has residue of odor of acetic acid.

Comparative Example 4

To 100 weight parts of the mixture composed by 20 weight parts of polyethylene [PE] and 80 weight of polypropylene [PP] of Example 1, 10 weight parts of azodicarbonamide [ADCA; cell forming agent], 5.0 weight parts of divinylbenzene [DVB; cross-linking promoting agent], are added and kneaded by a double shaft kneading extruder and extruded as a sheet and non-cross-linked, non-foamed composition is obtained.

Then, to the resin composition sheet an electron beam of 6 Mrad is irradiated, and is cross-linked and foamed at atmosphere at 220° C., and the sheet of cross-linked foam whose density is 0.07 g/cm$^3$ and thickness is 8.7 mm is obtained.

This cross-linked foam skin is a foam of 120 $\mu$m average cell size, 78% degree of crystallinity, 60% hysteresis loss, 64.0% gel fraction, 2100 g/cm$^2$ 50% compressive stress and 1.3% hot dimensional shrinking ratio at 90° C., 22 hours.

Obtained sheet of cross-linked foam are sliced to 3 mm thickness and infrared rays is irradiated, then cold pressed between a flat plate and a plate on which grained pattern is engraved at compressive ratio 50% and 90%. The surface of the foam faced to the flat plate becomes smooth surface with a skin layer, and to the surface of the foam faced to the plate with grained pattern the pattern is seemed to be clearly transcribed, however, the transcribed ratio of grained pattern are low, 64% and 43%, because after heating, the permanent deformation at pressing process are big. After the surface heat treatment, 50% compressive stress and hot dimensional shrinking ratio at 90° C., 22 hours are measured and the result of 2300 g/cm$^2$ and 0.7% can be obtained. The heat resistance is good, however, softness is hurt.

The property of surface decorated foams mentioned in Examples 1 to 5 and Comparative Examples 1 to 4 are summarized in Table 1 and Table 2.

TABLE 1

| properties | | Ex. 1 | Ex. 2 | Ex. 3 | Ex. 4 | Ex. 5 |
|---|---|---|---|---|---|---|
| foam | cell size ($\mu$m) | 80 | 95 | 58 | 64 | 110 |
| | crystallinity (%) | 8 | 8 | 27 | 16 | 21 |
| | hysteresis loss (%) | 20 | 22 | 25 | 21 | 20 |
| | gel fraction (%) | 77 | 71 | 65 | 76 | 67 |
| | 50% compressive hardness (g/cm$^2$) | 650 | 980 | 750 | 690 | 740 |
| | dimensional shrinking ratio (%) | 3.3 | 3.5 | 2.5 | 1.5 | 1.1 |
| foam after surface heat treated | 50% compressive hardness (g/cm$^2$) | 600 | 970 | 730 | 660 | 710 |
| | | soft | soft | soft | soft | soft |
| | dimensional shrinking ratio (%) | 1.1 | 1.3 | 0.7 | 0.9 | 0.8 |
| | | good | good | good | good | good |
| | surface smoothness | good | good | good | good | good |
| | grained pattern appearance | good | good | good | good | good |
| | grained pattern transcribed ratio (%) | | | | | |
| | 50% compressed | 91 | 83 | 74 | 86 | 94 |
| | 100% compressed | 96 | 93 | 87 | 93 | 96 |

TABLE 2

| properties | | Co. Ex. 1 | Co. Ex. 2 | Co. Ex. 3 | Co. Ex. 4 |
|---|---|---|---|---|---|
| foam | cell size ($\mu$m) | 150 | 110 | 80 | 120 |
| | crystalline ratio (%) | 0 | 55 | 9 | 78 |
| | hysteresis loss (%) | 20 | 55 | 45 | 60 |
| | gel fraction (%) | 90 | 78 | 93 | 64 |
| | 50% compressive hardness (g/cm$^2$) | 630 | 1500 | 1100 | 2100 |
| | dimensional shrinking ratio (%) | 5.3 | 7.3 | 8.5 | 1.3 |
| foam after surface heat treated | 50% compressive hardness (g/cm$^2$) | 600 | 1800 | 1500 | 2300 |
| | | soft | hard | hard | hard |
| | dimensional shrinking ratio (%) | 6.1 | 1.3 | 0.7 | 0.9 |
| | | not good | not good | not good | good |
| | surface smoothness | not good | good | good | good |
| | sharpness of grained pattern | not good | good | good | good |
| | grained pattern transcribe ratio (%) | | | | |
| | 50% compressed | 8 | 65 | 15 | 64 |
| | 90% compressed | 13 | 35 | 25 | 43 |

From these Examples, the cross-linked foam like surface layer of rubbery soft olefin resin of this invention which is composed by a rubbery soft olefin resin and has properties of average cell size is 50 $\mu$m to 400 m$\mu$, degree of crystallinity of the foam is 5 to 40%, hystereresis loss is smaller than 35% and transcribed ratio of grained pattern is bigger than 40%, has a good surface smoothness, an excellent surface heat processability, a good heat resistance and softness and rubbery elasticity. Further, the decorated foam which has a leather like appearance can be obtained.

The Possibility For the Industrial Use

As mentioned above, the cross-linked foam like surface layer of this invention, the fine and silver like surface layer can be obtained by foaming with skin and by transcribing the grained pattern and further the surface intensity is improved. On the contrary, by forming transcribed pattern and network on the sliced surface of foam, the surface layer with grained pattern or cloth pattern with good feeling. And in any case, the rubbery soft olefin resin cross-linked foam like surface layer is not creased and fine and deep pattern can be embossed, has good feeling and surface intensity can be improved. Thus the surface layer which is suited to the interior surface decoration can be provided.

What is claimed is:

1. A surface decorated foam skin of cross-linked rubbery soft olefin resin, comprising rubbery soft olefin resin, characterizing by having average cell diameter of 50 to 400 $\mu$m, a degree of crystallinity of 5 to 40% and a hysteresis loss of 35% or lower.

2. The surface decorated foam skin of cross-linked rubbery soft olefin resin of claim 1, wherein the gel fraction of said rubbery soft olefin resin is 20 to 98%.

3. The surface decorated foam skin of cross-linked rubbery soft olefin resin of claim 1, wherein the 50% compressive stress is 0.3 to 1.5 kg/cm$^2$ and 90% hot dimensional shrinking ratio is 5% or lower.

4. The surface decorated foam skin of cross-linked rubbery soft olefin resin of claim 1, wherein the grained pattern transcribed ratio is 40% or higher.

* * * * *